United States Patent [19]
Takano

[11] Patent Number: 5,351,385
[45] Date of Patent: Oct. 4, 1994

[54] METHOD OF MOUNTING RUBBER PLUG TO WIRE

[75] Inventor: Yukinori Takano, Shizuoka, Japan

[73] Assignee: Yazaki Corporation, Tokyo, Japan

[21] Appl. No.: 113,308

[22] Filed: Aug. 30, 1993

[30] Foreign Application Priority Data

Aug. 31, 1992 [JP] Japan .................................. 4-231921

[51] Int. Cl.$^5$ ............................................ B23P 11/02
[52] U.S. Cl. ........................................ 29/450; 29/881
[58] Field of Search .................. 29/450, 433, 854, 857, 29/881, 235, 729, 754, 809

[56] References Cited

U.S. PATENT DOCUMENTS

| 4,653,182 | 3/1987 | Fukuda et al. | 29/450 |
| 4,765,052 | 8/1988 | Fukuda et al. | 29/450 |
| 5,007,164 | 4/1991 | Kato | 29/450 |
| 5,016,346 | 5/1991 | Gerst et al. | 29/754 |

FOREIGN PATENT DOCUMENTS 64-9131 2/1989 Japan .

*Primary Examiner*—P. W. Echols
*Assistant Examiner*—David P. Bryant

*Attorney, Agent, or Firm*—Finnegan, Henderson, Farabow, Garrett & Dunner

[57] ABSTRACT

A method of mounting a rubber plug to a wire used for a waterproof connector in which the fluctuation in the position of the rubber plug about the wire is reduced. The mounting method comprises the steps of: accommodating the rubber plug in a mounting jig such that the thick portion of the rubber plug is positioned at open end of the mounting jig; grasping a tip of the wire between a pair of guides such that the tip opposes the thick portion of the rubber plug; aligning an axis of the wire with that of the wire insertion hole of the rubber plug; moving the mounting jig toward the wire to insert the rubber plug into the wire while moving the pair of guides in the same direction as the mounting jig moves; projecting the tip of the wire from the thin portion of the rubber plug by the sum of the predetermined length and a supplementary length; moving the mounting jig in the direction away from the pair of guides to release the rubber plug therefrom; moving the pair of guides toward the mounting jig while pushing the rubber plug by the length of the supplemental length toward the tip of the wire to project the wire from the end of the thin portion of the rubber plug by the predetermined length.

3 Claims, 8 Drawing Sheets

PRIOR ART

FIG. 7B

PRIOR ART

PRIOR ART

FIG. 11B
PRIOR ART

METHOD OF MOUNTING RUBBER PLUG TO WIRE

BACKGROUND OF THE INVENTION

1. Field of the Invention

This invention relates to a method of mounting a rubber plug to a wire used for a waterproof connector in which the fluctuation in the position of the rubber plug about the wire is reduced.

2. Description of the Prior Art

In a waterproof connector used for connecting wire harnesses, a rubber plug 2 is inserted into an end of a wire 1 as illustrated in FIGS. 7A to 8B, and then a terminal 23 is calked so as to be fixed to the wire together with the rubber plug.

Figure 8A:
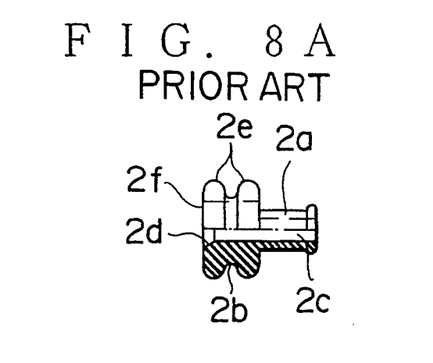
FIGS. 8A and 8B are a partially cross-sectional view and a front view of the rubber plug shown in FIG. 7A.
Figure 8B:
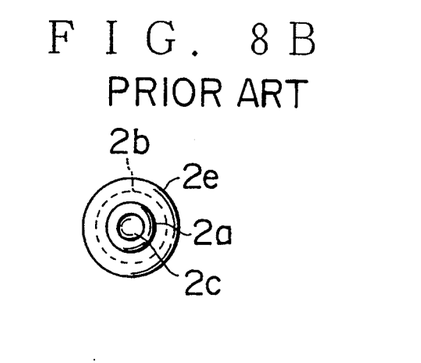

The rubber plug 2 consists of a thin portion 2a with a small diameter and a thick portion 2b with a large diameter, as illustrated in FIGS. 8A and 8B. A wire insertion hole 2c is formed in the rubber plug 2, and a tapered wire insertion guide 2d is formed in the wire insertion hole 2c on the side that the wire 1 is inserted. Further, projections 2e are formed on an outer periphery of the thick portion 2b. Reference symbol L1 shows the length of the thin portion 2a. L2 shows the length of the thick portion 2b.

Figure 7A:
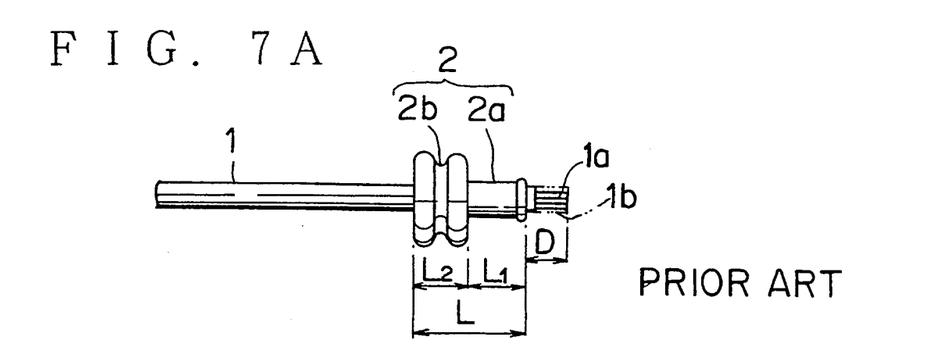
FIGS. 7A and 7B are side views of a wire with a rubber plug, and a terminal.
Figure 7B:
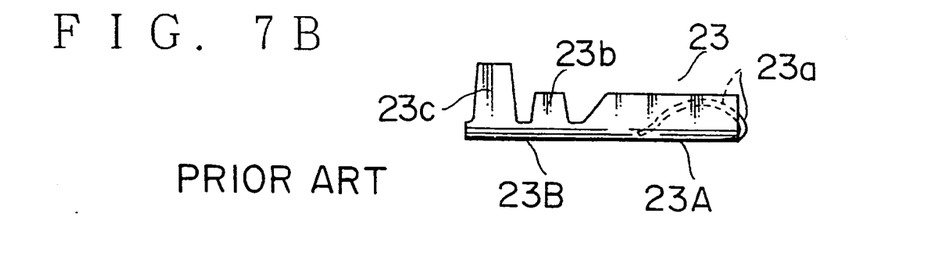

After the wire 1 is positioned so as to project, from an end of the thin portion 2a of the rubber plug 2 by a predetermined length D as illustrated in FIG. 7A, an insulating coating 1b is removed by a stripping device not shown. Conductor crimping pieces 23b of a wire connecting portion 23B of the terminal 23 in FIG. 7B are used to crimp an exposed core wire 1a, and insulating calking pieces 23c crimp the thin portion 2a with a small diameter. Reference symbol 23A shows an electrical contact portion for a mated terminal and Reference Numeral 23a shows a resilient contact piece.

Figure 9:
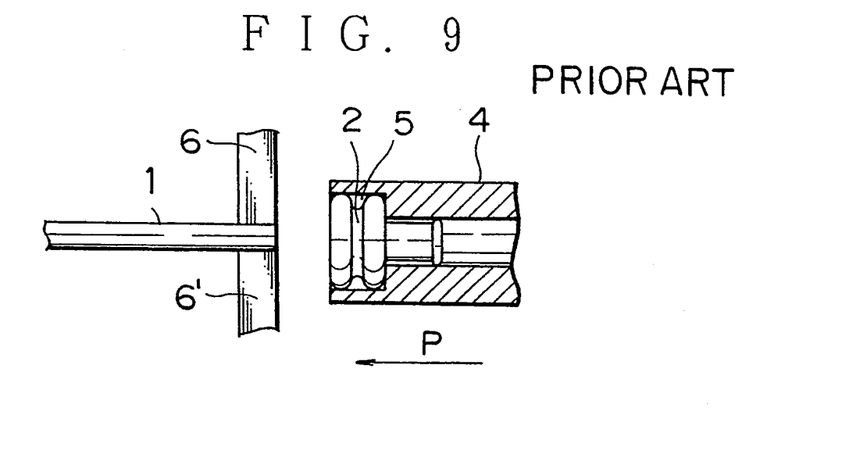
FIG. 9 is a partially cross-sectional view for explaining a conventional rubber plug mounting method.
Figure 10:
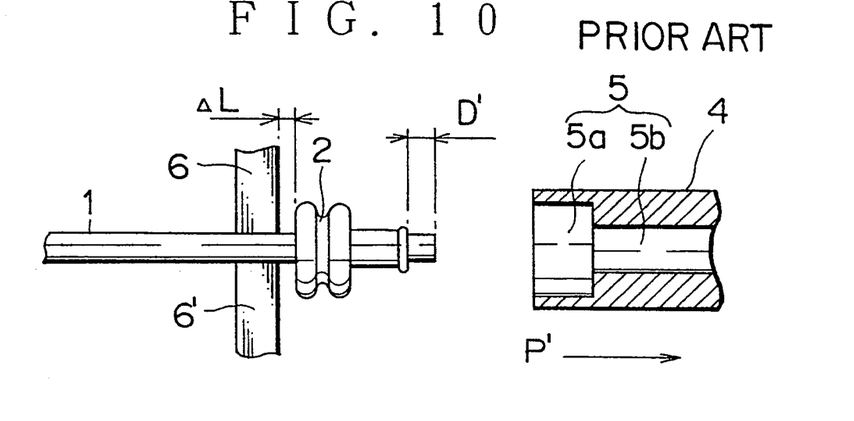
FIG. 10 is a side view showing a condition that the rubber plug is attached to the wire in the conventional method.

FIGS. 9 and 10 show a rubber plug mounting method with a conventional rubber plug mounting apparatus, as disclosed in Japanese patent publication (examined) No. Showa 64-9131. Reference numeral 4 shows a jig and a rubber plug accommodating portion 5 with a tiered portion concavely formed therein. The rubber plug accommodating portion 5 consists of a large hole 5a with a diameter substantially the same as that of the thick portion 2b of the rubber plug 2, and a small hole 5b with a diameter sufficiently larger than that of thin portion 2a of the rubber plug 2.

The rubber plug 2 is accommodated in the accommodating portion 5 in advance, and the wire 1 is aligned with the wire insertion hole 2c by a pair of guides 6 and 6' which are vertically arranged. Then, the mounting jig 4 proceeds in the direction indicated by an arrow P toward the wire 1, and the guides 6 and 6' are simultaneously moved in the same direction at the same velocity to insert the rubber plug 2 to the wire 1 by a predetermined length as illustrated in FIG. 9. The length that the rubber plug 2 is inserted is the sum of an overall length of the rubber plug 2 and a prescribed projection length D. Finally, the jig 4 is moved in the direction indicated by an arrow P' to release the rubber plug, which permits a projecting length of the wire 1 from the thin portion 2a to be adjusted to the predetermined length D as illustrated in FIG. 10. However, with the method described above, a return $\Delta L$ of the rubber plug 2 is generated as a matter of fact, which provides a gap between the guides 6 and 6'. As a result, a projecting length D' does not coincide the setting value D, resulting in fluctuation in the position of where the rubber plug 2 is situated about the wire 1.

Figure 11A:
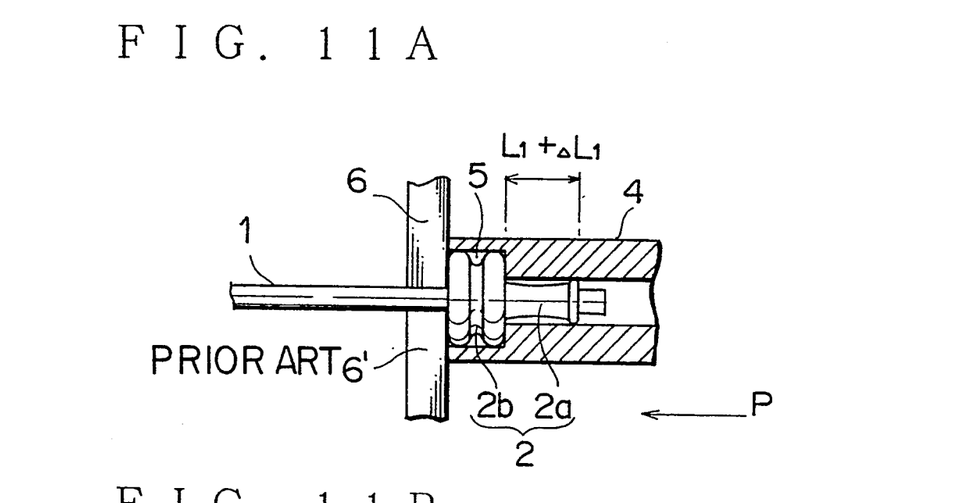
FIGS. 11A and 11B are partially cross-sectional views for explaining a reason why the fluctuation in the position of the rubber plug about the wire occurs.
Figure 11B:
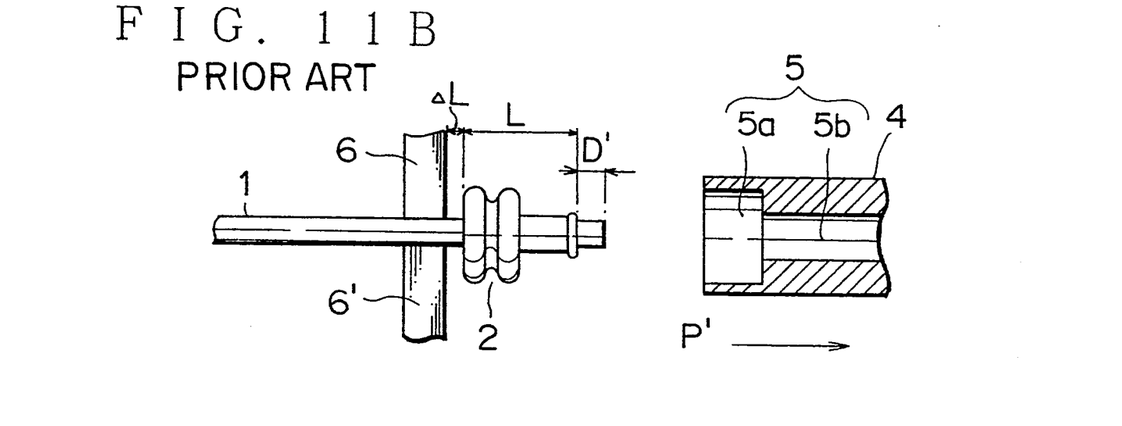

The reason for the fluctuation is because the resilient thin portion 2a with a small diameter elongates by $\Delta L1$ from an original length L1 due to a frictional resistance between the wire insertion hole 2ac of the rubber plug 2 and the wire 1, as illustrated in FIG. 11A. The release from the jig 4 causes the thick portion 2b with large diameter of the rubber plug 2 to move on the side of the thin portion 2a with small diameter 2a by the resilience of the overall rubber plug 2. However, the return length is fluctuated due to dimensional tolerance and uneven resilience of the rubber plug 2. Therefore, even if the insertion length of the rubber plug 2 to the wire 1 is constantly maintained, the fluctuation in the position of the rubber plug 2 could not be prevented effectively.

SUMMARY OF THE INVENTION

The present invention has been accomplished to eliminate the drawbacks of the conventional rubber plug mounting method described above, and the object thereof is to provide a rubber plug mounting method in which the fluctuation in the position of the rubber plug about the wire is reduced and the rubber plug is stably attached to the wire connecting portion of the terminal.

In a method of mounting a rubber plug to a wire according to the present invention, the rubber plug comprises: a thin portion with a small diameter at an end thereof; a thick portion with a large diameter at another end thereof; and a wire insertion hole, and a wire is inserted from said thick portion and is attached to the rubber plug so as to project from an end of the thin portion of the rubber plug by a predetermined length. The mounting method comprises the steps of: accommodating the rubber plug in a mounting jig such that the thick portion of the rubber plug is positioned at an open end of the mounting jig; grasping a tip of the wire between a pair of guides such that the tip opposes the thick portion of the rubber plug; aligning an axis of the wire with that of the wire insertion hole of the rubber plug; moving the mounting jig toward the wire to insert the rubber plug into the wire while moving the pair of guides in the same direction as the mounting jig moves; projecting the tip of the wire from the thin portion of the rubber plug by the sum of the predetermined length and a supplementary length; moving the mounting jig in the direction away from the pair of guides to release the rubber plug therefrom; moving the pair of guides toward the mounting jig while pushing the rubber plug by the length of the supplemental length toward the tip of the wire to project the wire from the end of the thin portion of the rubber plug by the predetermined length.

BRIEF DESCRIPTION OF THE DRAWINGS

The present invention will be more apparent from the ensuring description with reference to the accompanying drawing wherein.

DETAILED DESCRIPTION OF PREFERRED EMBODIMENTS

A rubber plug mounting method according to the present invention will be explained with reference to FIGS. 1A to 6. In the figures, like reference characters used in the figures for explaining a conventional method designate like or corresponding parts in FIG. 1A to 6.

Figure 1A:
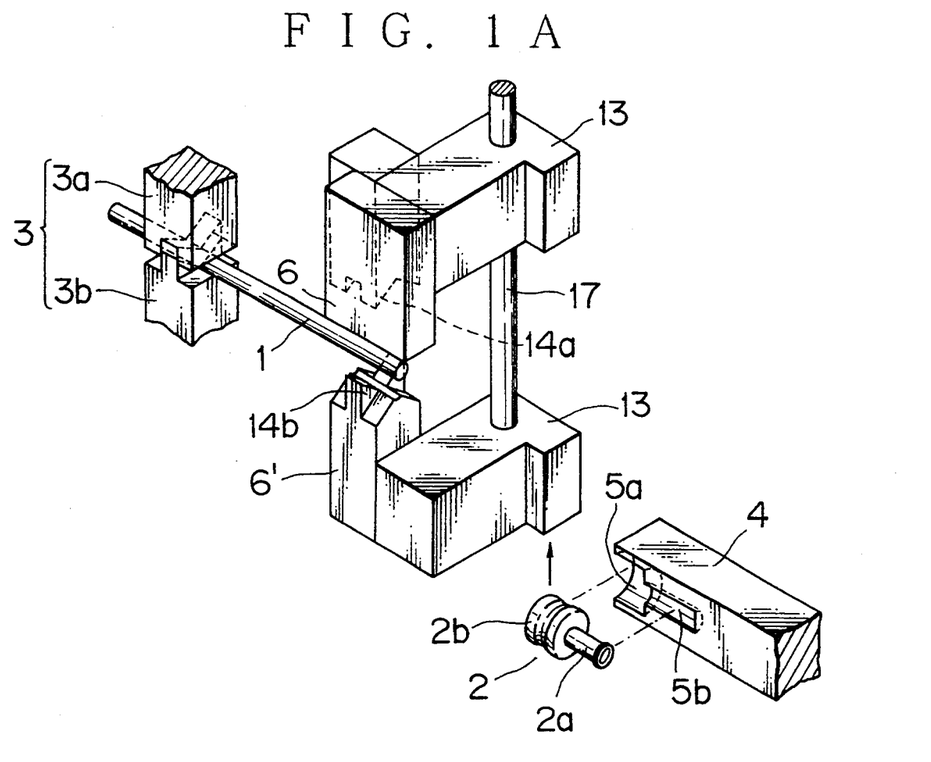
FIGS. 1A and 1B are a perspective view and a cross-sectional view for explaining a first process of a rubber plug mounting method according to the present invention.
Figure 1B:
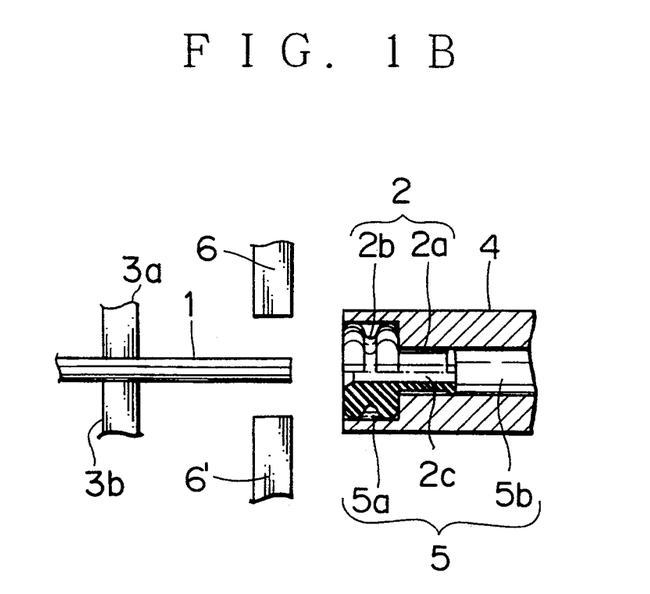

Reference numeral 1 shows a wire to which a rubber plug 2 is attached. Numeral 3 shows a clamp for clamping the wire 1, and 4 a mounting jig for accommodating the rubber plug 2 before inserting into the wire 1. A tip of the wire 1 is to be grasped by a pair of guides 6 and 6', which are vertically arranged through a rod 17.

The rubber plug 2 is fed to a rubber plug accommodating portion 5 of the mounting jig 4 from the side of the accommodating portion 5, as illustrated in FIGS. 1A and 1B. The rubber plug 2 is fed from a feeder (not shown) in such a manner that a thick portion 2b with a large diameter of the rubber plug 2 opposes a wire 1 to which the rubber plug 2 is attached. The wire 1 is clamped by the clamp 3 at a position apart from an end of the wire 1. An end face 2f of the rubber plug 2 is preferably flush with an end face of the jig 4, but, some tolerance is allowable in the position of the end face 2f about the end face of the jig 4.

Figure 2A:
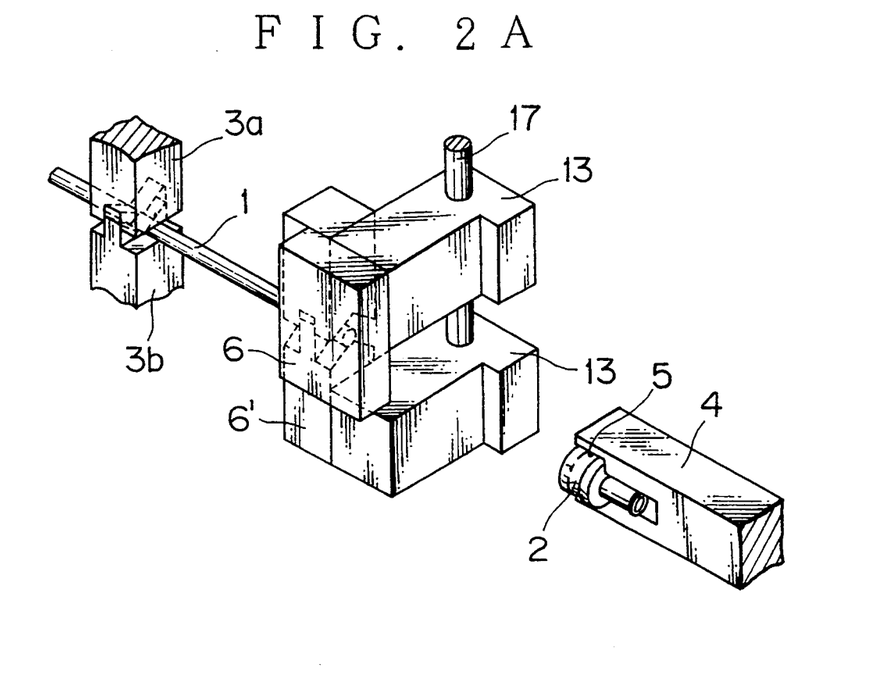
FIGS. 2A and 2B are a perspective view and a cross-sectional view for explaining a second process of the rubber plug mounting method according to the present invention.
Figure 2B:
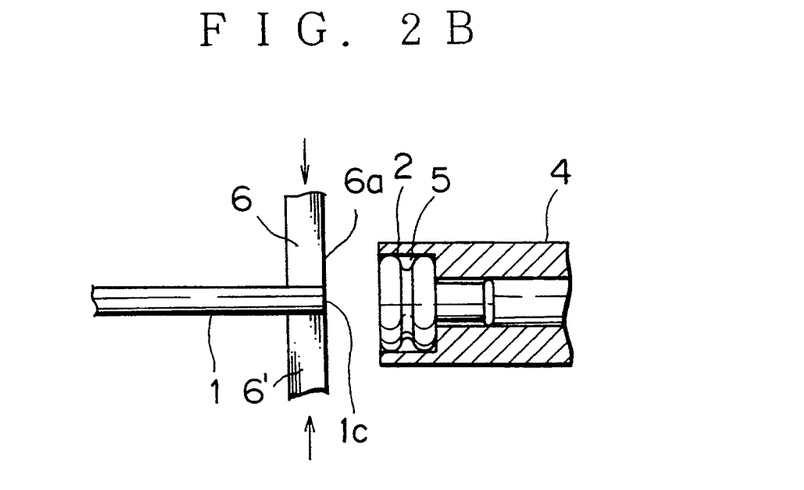

Then, the pair of guides 6 and 6', which are vertically arranged, approach and grasp a tip of the wire 1 to align the wire 1 with a wire insertion hole 2c of the rubber plug 2, as illustrated in FIGS. 2A and 2B. It is preferable that an end face 1c of the wire 1 is flush with faces 6a of the guides 6 and 6' during the alignment, but, it is allowable that the end face 1c slightly projects from the faces 6a.

Figure 3A:
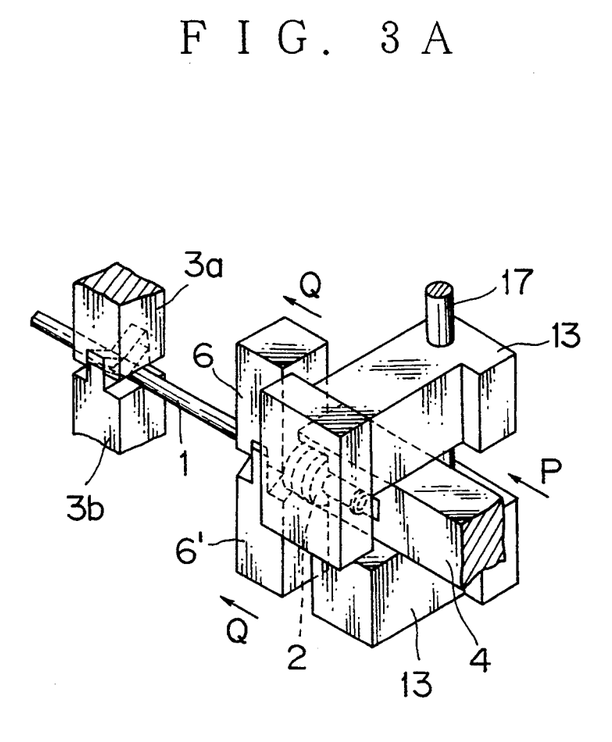
FIGS. 3A and 3B are a perspective view and a cross-sectional view for explaining a third process of the rubber plug mounting method according to the present invention.
Figure 3B:
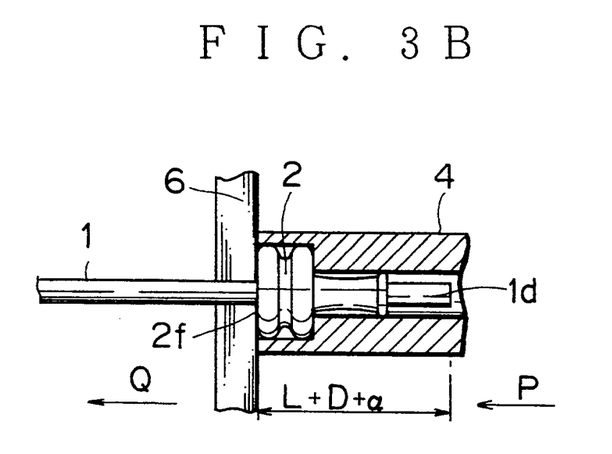

Next, the mounting jig 4 proceeds toward the wire 1 in the direction indicated by an arrow P to allow an end 1d of the wire 1 to project from a thin portion 2a with a small diameter of the rubber plug 2, as illustrated in FIGS. 3A and 3B. The guides 6 and 6' also move in the direction indicated by an arrow Q while clamping the wire 1 in synchronization with the movement of the jig 4. The distance that the mounting jig 4 proceeds is adjusted so that the length from the end 1d of the wire from an end face 2f of the rubber plug 2 becomes the sum of an overall length L of the rubber plug 2, a predetermined projection length D of the wire 1 from the thin portion 2a with small diameter of the rubber plug 2, and a supplemental length α. That is, the rubber plug 2 is inserted into the wire 1 more than a desired insertion length (L+D) by the supplemental length α. The supplemental length α is set to be slightly longer than the length ΔL shown in FIG. 10.

Figure 4A:
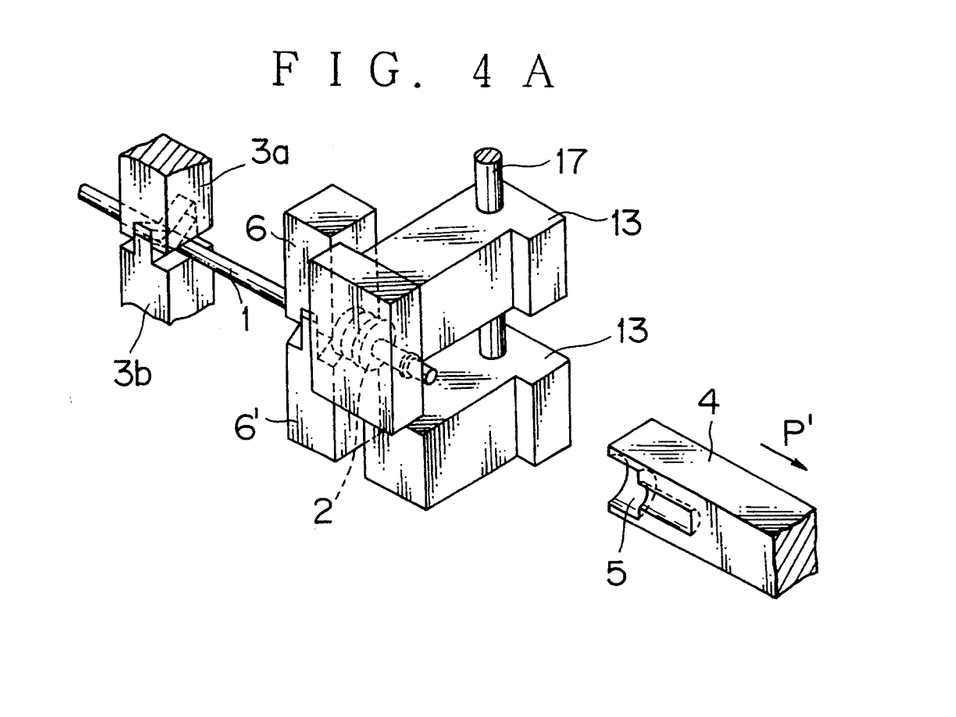
FIGS. 4A and 4B are a perspective view and a cross-sectional view for explaining a fourth process of the rubber plug mounting method according to the present invention.
Figure 4B:
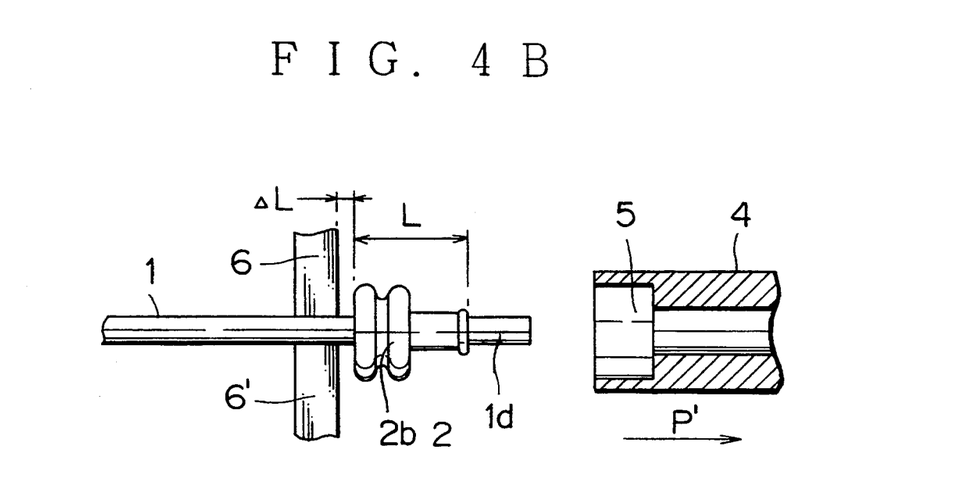

Then, the jig 4 moves in the direction indicated by an arrow P', as illustrated in FIGS. 4A and 4B, to release the rubber plug 2 from the rubber plug accommodating portion 5. As a result, a gap ΔL remains between the thick portion 2b with a large diameter of the rubber plug 2 and the guides 6 and 6' due to the return action described above and as illustrated in FIG. 11. However, the supplemental length α is designed to be longer than the gap ΔL.

Figure 5A:
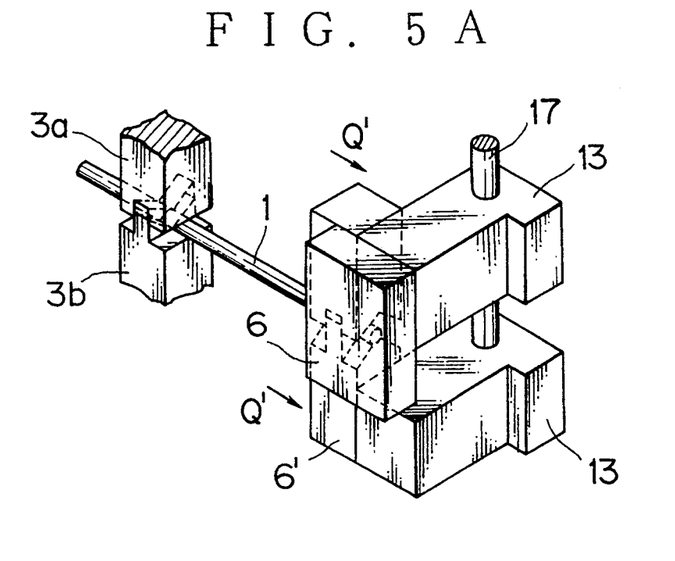
FIGS. 5A and 5B are a perspective view and a cross-sectional view for explaining a fifth process of the rubber plug mounting method according to the present invention.
Figure 5B:
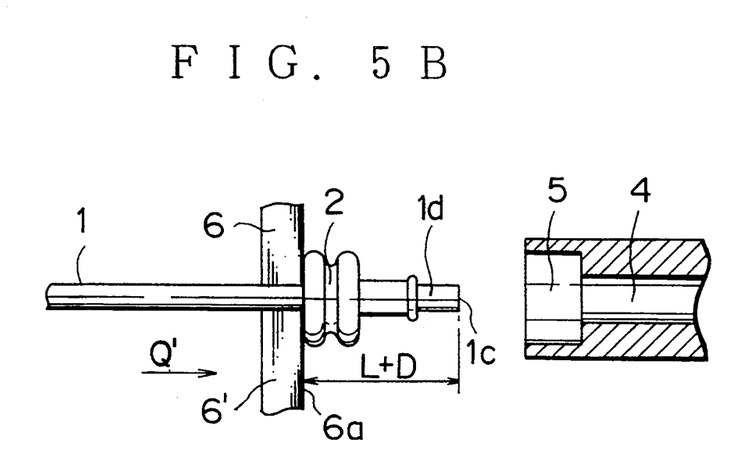

Next, the guide 6 and 6' move in the direction indicated by an arrow Q' as illustrated in FIGS. 5A and 5B to return the rubber plug 2 toward the end of the wire 1. The return length varies with the rubber plug 2, but, the position of the rubber plug 2 is constantly maintained by returning the rubber plug 2 to the position where the end face 6a of the guides 6 and 6' becomes a prescribed distance L+D from the end of the wire 1.

Figure 6:
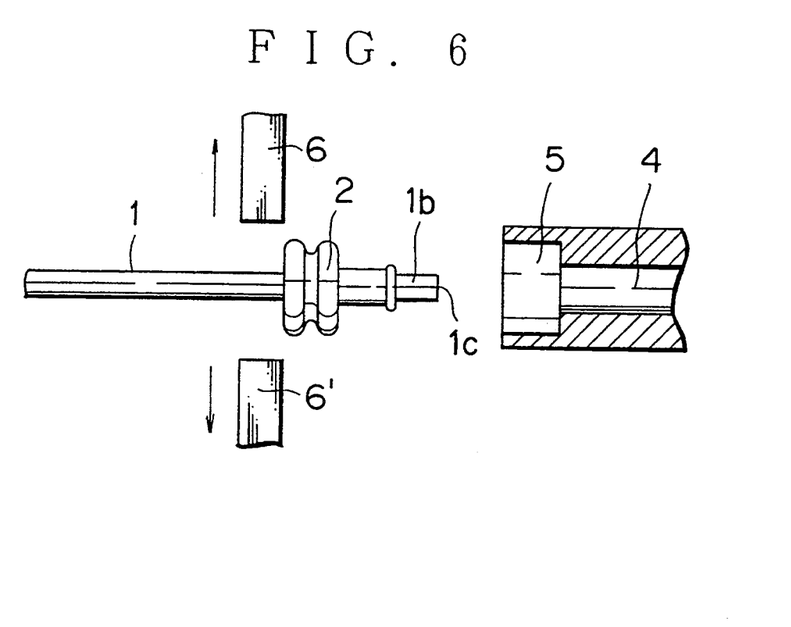
FIG. 6 is a cross-sectional view for explaining a final processor the rubber plug mounting method according to the present invention.

Finally, the guides 6 and 6' are opened to release the wire 1 as illustrated in FIG. 6. As a result, the wipe 1 with a rubber plug 2 at the desired position from the end face 1c thereof is obtained.

What is claimed is:

1. A method of mounting a rubber plug to a wire wherein said rubber plug comprises a thin portion with a small diameter at an end thereof, a thick portion with a large diameter at another end thereof, and a wire insertion hole, and wherein a wire is to be inserted from said thick portion and attached to the rubber plug so as to project from an end of the thin portion of the rubber plug by a predetermined length, said mounting method comprising the steps of:

accommodating the rubber plug in a mounting jig such that said thick portion of the rubber plug is positioned at an open end of the mounting jig;

grasping a tip of the wire between a pair of guides and orienting the wire using the guides to a position where said tip opposes the thick portion of the rubber plug;

aligning an axis of the wire with that of the wire insertion hole of the rubber plug;

moving said mounting jib toward the wire to insert the wire in through the large diameter of the rubber plug while moving said pair of guides in the same direction as said mounting jig moves;

projecting the tip of the wire from the thin portion of the rubber plug by the sum of said predetermined length and a supplemental length;

moving said mounting jig in the direction away from the pair of guides to release the rubber plug therefrom;

moving the pair of guides toward the mounting jig while pushing said rubber plug by the length of said supplemental length toward the tip of the wire to project said wire from said end of the thin portion of the rubber plug by said predetermined length.

2. A method of mounting a rubber plug to a wire as claimed in claim 1, wherein said mounting jig includes a rubber plug accommodating portion comprising a large hole with a diameter substantially the same size as that of said thick portion of the rubber plug, and a small hole with a diameter larger than that of said thin portion of the rubber plug.

3. A method of mounting a rubber plug to a wire as claimed in claim 1, wherein said wire is fixed by a clamp at a predetermined distance from said tip thereof during all steps of the mounting process.

\* \* \* \* \*

UNITED STATES PATENT AND TRADEMARK OFFICE
CERTIFICATE OF CORRECTION

PATENT NO. : 5,351,385
DATED : October 04, 1994
INVENTOR(S) : Yukinori TAKANO

It is certified that error appears in the above-indentified patent and that said Letters Patent is hereby corrected as shown below:

Item [57] Abstract, line 8 before "open" insert --an--.

Claim 1, column 4, line 53 change "jib" to --jig--.

Signed and Sealed this

Sixth Day of June, 1995

Attest:

BRUCE LEHMAN

Attesting Officer

Commissioner of Patents and Trademarks